United States Patent
Stoneham

(10) Patent No.: US 12,463,625 B2
(45) Date of Patent: Nov. 4, 2025

(54) DELAY-ADJUSTED DIGITAL-UNIT INTERFACE

(71) Applicant: Edward B. Stoneham, Las Vegas, NV (US)

(72) Inventor: Edward B. Stoneham, Las Vegas, NV (US)

( * ) Notice: Subject to any disclaimer, the term of this patent is extended or adjusted under 35 U.S.C. 154(b) by 174 days.

(21) Appl. No.: 18/578,686

(22) PCT Filed: Jul. 12, 2022

(86) PCT No.: PCT/US2022/036761
§ 371 (c)(1),
(2) Date: Jan. 11, 2024

(87) PCT Pub. No.: WO2023/287744
PCT Pub. Date: Jan. 19, 2023

(65) Prior Publication Data
US 2025/0007503 A1    Jan. 2, 2025

Related U.S. Application Data

(60) Provisional application No. 63/221,012, filed on Jul. 13, 2021.

(51) Int. Cl.
*H03K 5/131* (2014.01)
*H03K 5/00* (2006.01)

(52) U.S. Cl.
CPC ... *H03K 5/131* (2013.01); *H03K 2005/00058* (2013.01); *H03K 2005/00163* (2013.01)

(58) Field of Classification Search
None
See application file for complete search history.

(56) References Cited

U.S. PATENT DOCUMENTS 10,636,477 B2 * 4/2020 Stoneham ........... G11C 11/4091
2017/0344508 A1 * 11/2017 Setiawan ............. G06F 13/4022

* cited by examiner

*Primary Examiner* — Cassandra F Cox

(57) ABSTRACT

A delay-adjusted digital-unit interface comprises a first node, a second node, a third node, and an amplifier assembly. The first node is connected to a pull-up resistor and can be connected to the signal line of a transmission line connected to a first digital unit at a distal point. The second node is configured to be connected to a second reference electrical potential, a signal-return line of the transmission line, and a signal-return line of a second digital unit. The third node can be connected to a signal line of the second digital unit. The amplifier assembly is configured to be connected between the first node and the third node, to transform between high electrical potentials on the first node and lower electrical potentials on the third node, and to diversely delay low-to-high and high-to-low signal transitions transmitted by the second digital unit during communication with the first digital unit.

14 Claims, 4 Drawing Sheets

DELAY-ADJUSTED DIGITAL-UNIT INTERFACE

RELATED APPLICATIONS AND PATENTS

This application claims the benefit of U.S. Provisional Application No. 63/221,012, filed Jul. 13, 2021, which application is incorporated herein by reference in its entirety for all purposes.

BACKGROUND

In digital systems the need arises for one digital unit to communicate with another. The communication is frequently accomplished through interconnections employing wires or other conductors. These interconnections are often termed transmission lines. Electrical pulses on one or more conductors of one or more transmission lines are imposed by a digital unit at one position on each of the one or more transmission lines and are received by another digital unit connected distally to the same one or more transmission lines.

Under some communications protocols the relative timings of the low-to-high transitions and the high-to-low transitions of the electrical pulses play a role in determining how the information being received is interpreted. For example, the communications protocol may require that a data signal on one conductor must not rise or fall until after a clock signal on another conductor has fallen. A delay in the falling edge of the clock signal relative to the rising or falling edge of the data signal can result in a communications error if the delay is sufficient to cause the clock signal to fall after the data signal undergoes its transition. To assure error-free communications a digital unit transmits the rising and falling edges of the signals in the proper sequence.

The one or more transmission lines, especially if lengthy, lossy, unbalanced, or subject to electrical discontinuities, noise, electrical interference, and/or surges, can cause the relative timings of the rise and fall of signals at a receiving digital unit to differ from those at the digital unit that is transmitting the signals. To prevent consequent errors in communication, the one or more transmission lines are, in practice, limited in length, loss, unbalance, electrical discontinuities and exposure to noise, electrical interference, and surges to preserve at the receiving digital unit the relative rise and fall timings of the signals created by the transmitting digital unit.

SUMMARY

A delay-adjusted digital-unit interface is described.

In an example, a digital-unit interface includes a first node, a second node, a third node, and an amplifier assembly The first node is configured to be connected to one end of a pull-up resistor, the pull-up resistor having another end connected to a first reference electrical potential, the first node being configured to be connected to a signal line of a transmission line connected to a first digital unit at a distal point on the transmission line, the first digital unit applying a high electrical potential alternating with a low electrical potential to the signal line of the transmission line during communication with a second digital unit.

The second node is configured to be connected to a second reference electrical potential, to a signal-return line of the transmission line, and to a signal-return line of the second digital unit, the second reference electrical potential being less than the first reference electrical potential.

The third node is configured to be connected to a signal line of the second digital unit, the second digital unit presenting between its signal line and its signal-return line a closed circuit alternating with an open circuit while the second digital unit is transmitting to the first digital unit and a continuous open circuit while the second digital unit is not transmitting to the first digital unit.

The amplifier assembly is configured to be connected between the first node and the third node, the amplifier assembly configured to transform between the high electrical potential on the first node and a medium electrical potential on the third node, the medium electrical potential being less than the high electrical potential and greater than the second reference electrical potential, the amplifier assembly including a switch, a sensing circuit, and a delay element, the sensing circuit including an amplifier, the sensing circuit being responsive to a change in the impedance between the signal line and the signal-return line of the second digital unit for operating the switch, the sensing circuit configured to close the switch at the end of a first delay period following presentation by the second digital unit of a closed circuit between its signal line and its signal-return line and to open the switch at the end of a second delay period following presentation by the second digital unit of an open circuit between its signal line and its signal-return line, the first delay period and the second delay period being governed by the delay element.

DETAILED DESCRIPTION OF VARIOUS EMBODIMENTS

Figure 1:
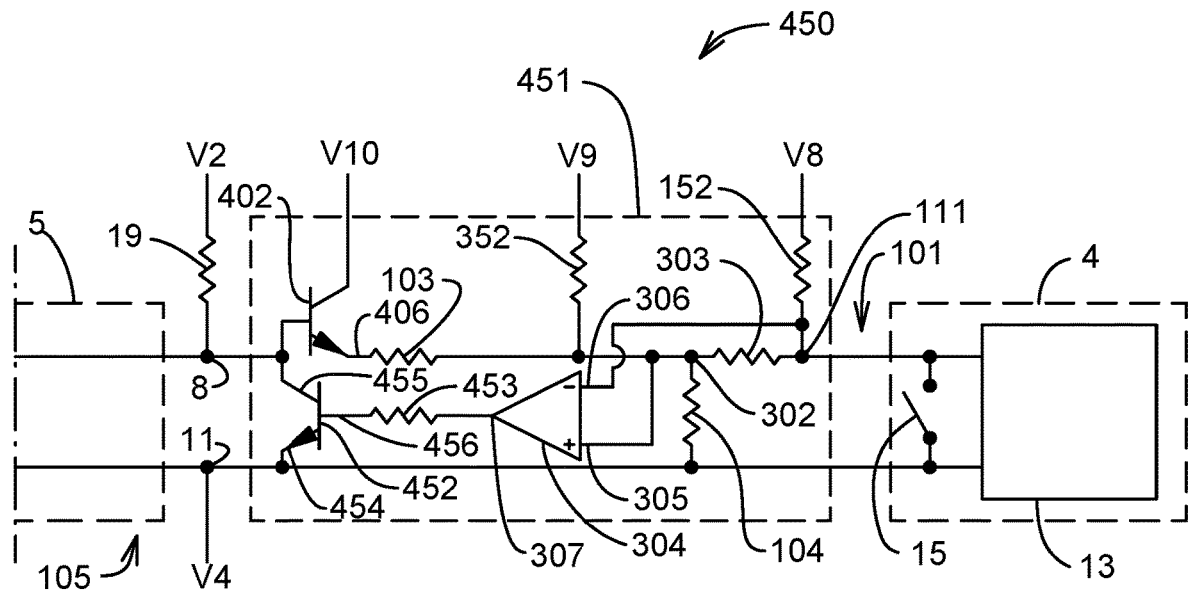
FIG. 1 is a schematic diagram of a digital communications circuit of the existing art.

The disclosed circuits and architectures for a delay-adjusted digital-unit interface will become better understood through review of the following detailed description in conjunction with the drawings. The detailed description and drawings provide examples of the various embodiments described herein. Those skilled in the art will understand that the disclosed examples may be varied, modified, and altered without departing from the scope of the disclosed structures. Many variations are contemplated for different applications and design considerations; however, for the sake of brevity, not every contemplated variation is individually described in the following detailed description.

With reference to the current art described in the Background section, it may be noted that distortions, such as length disparities, loss, unbalance, electrical discontinuities, noise, electrical interference, and/or surges, on the one or more transmission lines available for a particular application may be so great as to prevent error-free communications between digital units that are designed to transmit and receive signals over less imperfect transmission lines. For example, digital units using a protocol such as I²C that is designed for communications over wires or cables that are no more than a few tens of centimeters in length may fail to deliver error-free communications over transmission lines that are several meters in length. The failure can in some cases be due to alteration by the transmission line distortions of the relative timings of the low-to-high transitions and the high-to-low transitions of the signals at the receiving digital unit relative to the timings at the transmitting digital unit. For instance, a data signal transition that follows a high-to-low transition on a clock signal at the transmitting digital unit may be altered in transmission to the point that at the receiving digital unit the data signal transition precedes the high-to-low transition on the clock signal, thereby causing a communications error.

To prevent such an error it may be desirable to add circuitry at the transmitting digital unit that can increase the amount of delay between the high-to-low transition on the clock signal and the subsequent transition on the data signal. The extra delay may overcome the alteration in timing produced by the transmission lines, so that the transitions observed at the receiving digital unit will occur in the right order.

It is typical that circuitry added to delay a high-to-low transition will also produce delay on a low-to-high transition. In this example, a delay element can be added to the circuitry of a transmitting digital unit to delay both the rising edges and the falling edges of the data signal. This addition may, however, cause errors in parts of the protocol in which the transition in the data signal must precede a low-to-high transition of the clock signal. It would be helpful, therefore, to have the ability to delay the low-to-high transition of the clock signal by at least as much as the delay in the transitions of the data signal, while introducing little or no delay in the high-to-low transition of the clock signal. Then, the timing of the low-to-high transitions of the clock signal relative to transitions in the data signal will be preserved or improved while the delay between the high-to-low transitions of the clock signal and the subsequent transitions of the data signal will be increased in order to overcome the distortions of the transmission line.

As the example points out, it can be desirable to have the ability to produce in a digital unit a delay in the transmission of high-to-low transitions of a signal and a delay in the transmission of low-to-high transitions of that signal with the two delays being unequal. In general, a useful tool for overcoming errors caused by transmission line distortions would be a circuit that can produce a delay in low-to-high transitions on a transmitted signal that is arbitrarily longer or shorter than the delay in high-to-low transitions on that signal.

An embodiment of circuits and architectures for a delay-adjusted digital-unit interface designed to delay low-to-high and high-to-low transitions in a transmitted signal by arbitrary relative amounts is described in more detail with reference to FIGS. 1-7. In the various figures, like or similar features may have the same reference labels. Each figure may include one or more views of objects.

FIG. 1 shows a schematic diagram of a digital communications circuit 450 of the existing art. The figure is a copy of FIG. 10 of U.S. Pat. No. 10,636,477 with reference numbers unchanged. The operation of digital communications circuit 450 and the descriptions and purposes of its elements are described fully within the cited patent. In what follows, the various referenced elements will be addressed with the same names as those used in the description section of the cited patent.

Digital communications circuit 450 includes sensing interface 451, which is designed to translate a higher-voltage digital signal on second node 8 to a lower-voltage digital signal on low-voltage node 111 when in a receiving mode and to translate a lower-voltage digital signal on low-voltage node 111 to a higher-voltage digital signal on second node 8 when in a transmitting mode, with both signals referenced to electrical potential V4.

Figure 2:
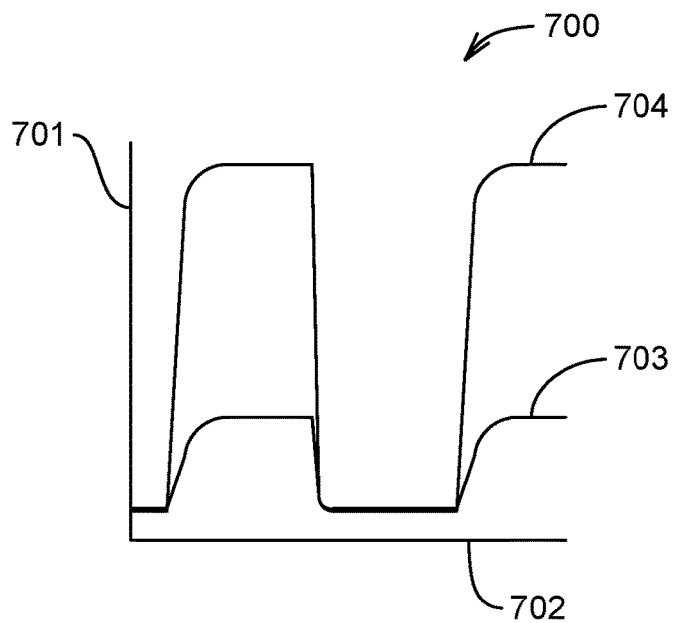
FIG. 2 is a graph of voltage versus time that depicts an input voltage waveform and an output voltage waveform of the digital interface within the digital communications circuit in FIG. 1 under typical operation in a transmitting mode.

FIG. 2 is a baseline graph 700 of voltage on vertical axis 701 versus time on horizontal axis 702 depicting waveforms that are typical under normal operating conditions for a baseline example of digital communications circuit 450 in a transmitting mode. In this baseline example the values of the circuit elements may be 20 kilohms for first divider resistor 103, 10 kilohms for current-limiting resistor 453, 1000 kilohms for second bias resistor 352, 5.6 kilohms for second divider resistor 104, 3.3 kilohms for current-sensing resistor 303, and 1000 kilohms for low-side pull-up resistor 152. In this baseline example functional amplifier 304 is assumed to have input bias currents under 10 picoamperes at its inverting input 306 and its noninverting input 305, and the output voltage swing at the output 307 of functional amplifier 304 is assumed to range from approximately zero volts at the low end to approximately 15 volts at the high end. In this baseline example it is also assumed that switching transistor 452 has a forward base-emitter turn-on voltage of about 0.7 volts and that no other unit connected to transmission line 5 is pulling down the voltage on second node 8. The electrical potentials V2, V8, V9, and V10 in this baseline example are assumed to be at 15 volts with respect to electrical potential V4.

Low-voltage waveform 703 in FIG. 2 is a depiction of the lower-voltage digital waveform created at low-voltage node 111 by on-and-off switching of second switch 15 when digital communications circuit 450 is operating in transmitting mode. High-voltage waveform 704 is an example of the resulting higher-voltage digital waveform at second node 8. It may be noted that the rising and falling edges of the high-voltage waveform 704 coincide temporally with the corresponding rising and falling edges of the low-voltage waveform 703. In the normal operation of sensing interface 451 in the baseline example, delays of transitions in high-voltage waveform 704 relative to the corresponding transitions in low-voltage waveform 703 are minimal or insignificant.

Figure 3:
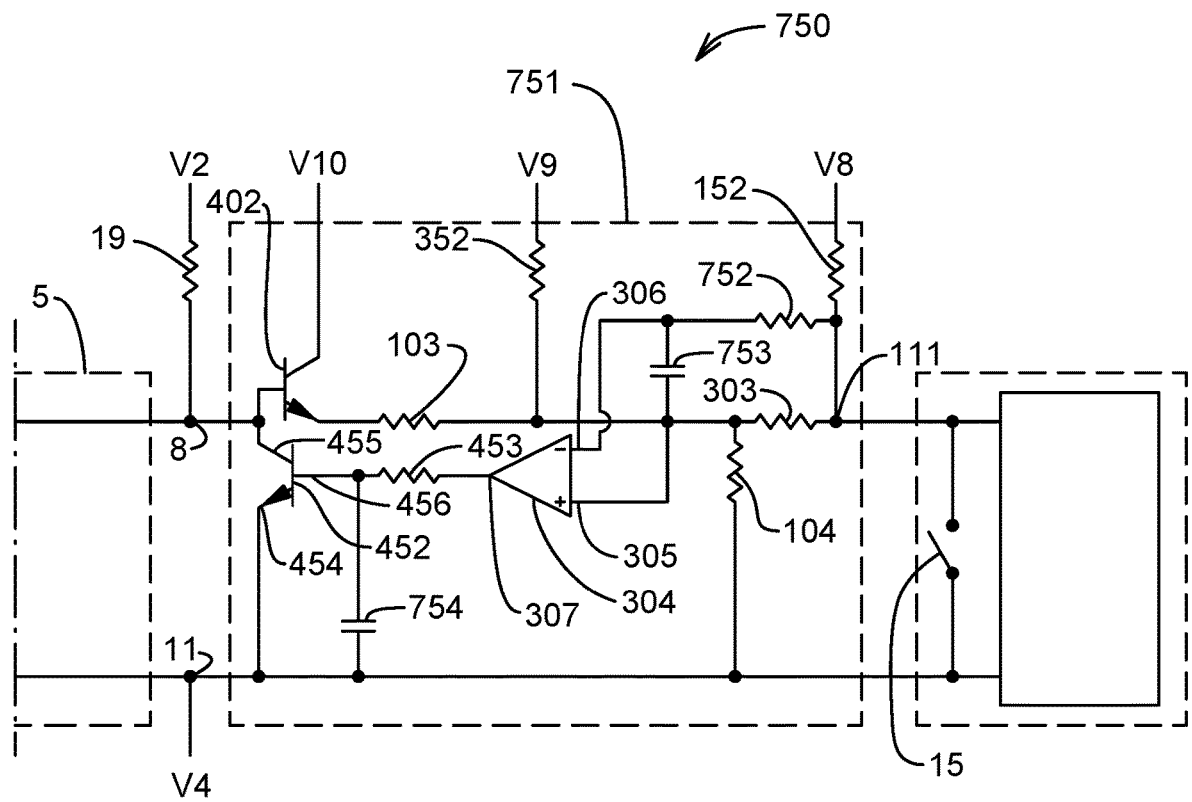
FIG. 3 is a schematic diagram of the digital communications circuit of FIG. 1 modified to include additional elements intended to produce pulse edge delays.

FIG. 3 shows a schematic diagram of an example of a modified digital communications circuit 750 similar to the digital communications circuit 450 in FIG. 1 but having a modified sensing interface 751 consisting of sensing interface 451 with three additional components. The three additional components are a charging resistor 752 connected at a first end to low-voltage node 111 and at a second end to the inverting input 306 of functional amplifier 304, a first delay capacitor 753 connected at a first end to the inverting input 306 and at a second end to the noninverting input 305 of functional amplifier 304, and a second delay capacitor 754 connected at a first end to the base 456 of switching transistor 452 and at a second end to fourth node 11.

Figure 4:
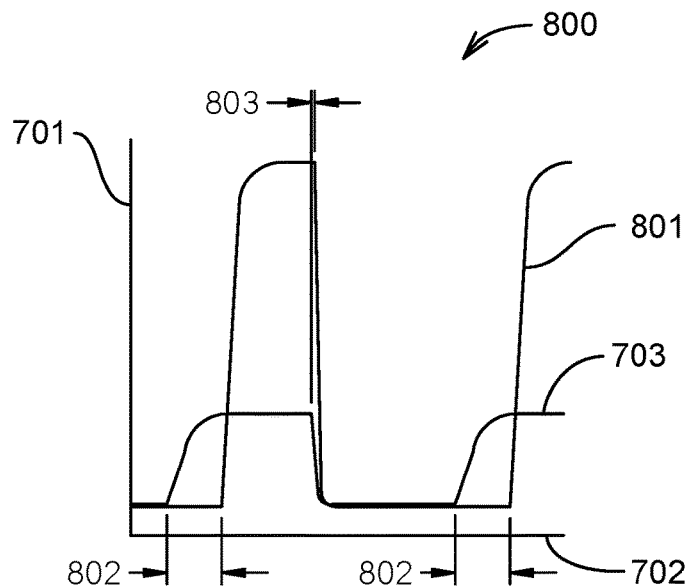
FIG. 4 is a graph in a format similar to that of FIG. 2 but depicting an input voltage waveform and an output voltage waveform of the digital interface within the digital communications circuit of FIG. 3 when the first delay capacitor and charging resistor are the elements producing the delays.

FIG. 4 is a first delay graph 800 having the same format as for the baseline graph 700. Depicted in first delay graph 800 are the low-voltage waveform 703 first presented in baseline graph 700 and a delayed high-voltage first delay waveform 801 representing the higher-voltage digital signal at second node 8 in a first delay example of modified digital communications circuit 750. In this first delay example the values of the circuit elements corresponding to the circuit elements of modified digital communications circuit 750 may be the same as their values in the aforedescribed baseline example of modified digital communications circuit 750, and the assumptions applied to the baseline example may also be applied to the first delay example. In addition, to this first delay example can be applied a first condition that second delay capacitor 754 is either zero in capacitance value or is removed from the circuit, a second condition that the capacitance value of first delay capacitor 753 is 1 nanofarad, and a third condition that the resistance value of charging resistor 752 is 100 kilohms. In this first delay example the rising-edge delay 802 indicated in FIG. 4 has a calculated value of 51 microseconds, and the falling-edge delay 803 indicated in FIG. 4 has a calculated value of 3 microseconds. In FIG. 4 it can also be observed that periods during which the high-voltage first delay waveform 801 is high in potential are shortened and periods during which the high-voltage first delay waveform 801 is low in potential are lengthened relative to the corresponding periods in the low-voltage waveform 703.

The first delay example exhibits the ability of first delay capacitor 753 in conjunction with charging resistor 752 to delay the rising edges of digital pulses substantially while producing minimal delay in the falling edges of digital pulses.

We may also consider a second delay example of modified digital communications circuit 750 identical to the first delay example, but with charging resistor 752 either reduced in value to zero ohms or replaced with a conductor and with the capacitance value of first delay capacitor 753 changed to 33 nanofarads. In this case, the rising-edge delay 802 has a calculated value of 53 microseconds, and the falling-edge delay 803 has a calculated value of 2 microseconds.

A third delay example of modified digital communications circuit 750 may now be considered to explore the effect of second delay capacitor 754 on rising-edge and falling-edge delays. This third delay example may be identical to the second delay example, but with first delay capacitor 753 now either reduced in value to zero nanofarads or having been removed from the circuit and with second delay capacitor 754 having been given a capacitance value of 33 nanofarads. In this third delay example, the rising-edge delay 802 has a calculated value of 51 microseconds, and the falling-edge delay 803 has a calculated value of 13 microseconds.

Figure 5:
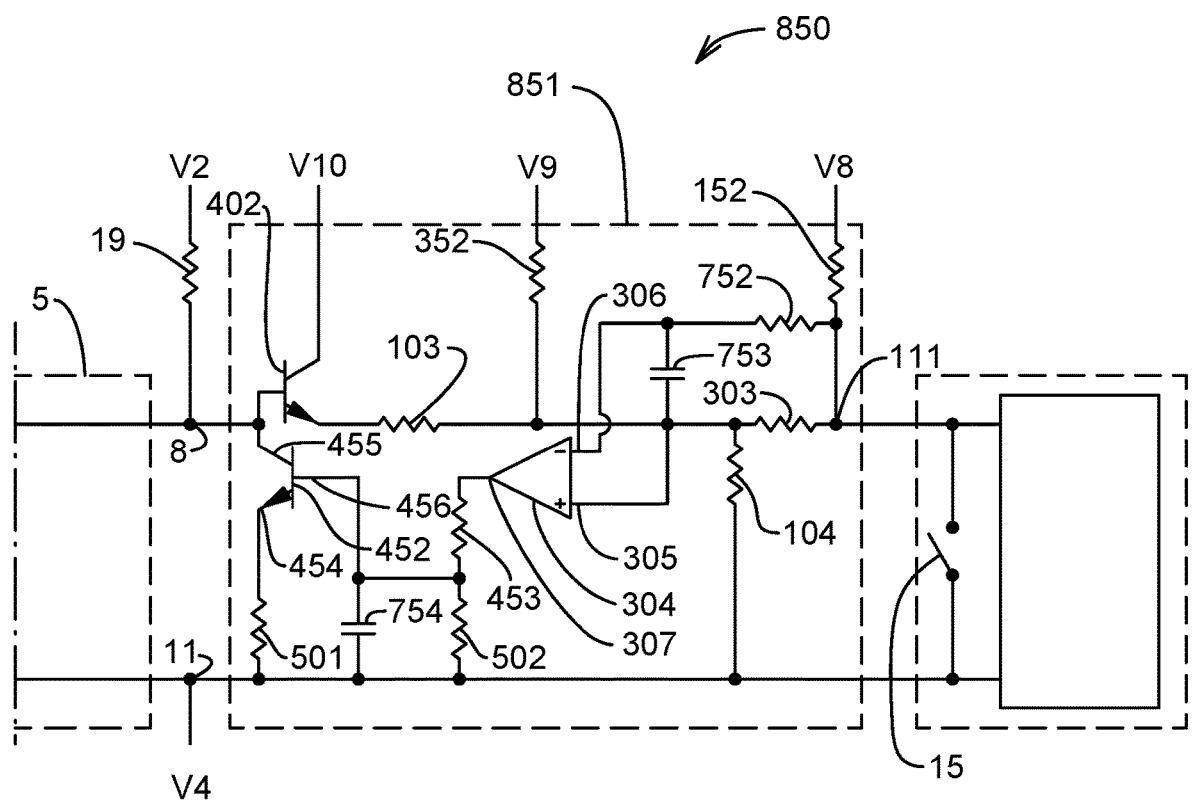
FIG. 5 is a schematic diagram of the digital communications circuit of FIG. 3 additionally modified to include additional elements that may act to reduce the charging voltage on the second delay capacitor and limit the amount of current that may be drawn through the switching transistor.

Relative delays of an opposite nature may be achieved if measures are taken to limit the voltage swing from the output 307 of functional amplifier 304. FIG. 5 shows a schematic diagram of an additionally modified digital communications circuit 850 similar to the modified digital communications circuit 750 in FIG. 3 but having an additionally modified sensing interface 851 consisting of modified sensing interface 751 with two additional components. The two additional components are feedback resistor 501 and voltage-dropping resistor 502, both of which are introduced in the description and in FIG. 14 of U.S. Pat. No. 10,636,477. Feedback resistor 501 is connected at a first end to the emitter 454 of switching transistor 452 and at a second end to fourth node 11 in order to limit, for reliability purposes, the current that can be drawn through switching transistor 452. Voltage-dropping resistor 502 is connected at a first end to the base 456 of switching transistor 452 and at a second end to fourth node 11 to reduce the voltage that can be applied to the base 456 of switching transistor 452 by output 307 of functional amplifier 304.

In a fourth delay example, the characteristics of all circuit elements that are common to both the modified digital communications circuit 750 and the additionally modified digital communications circuit 850 may have the same values as in the third delay example, except that the capacitance value of second delay capacitor 754 may be changed to 120 nanofarads. The resistance values of feedback resistor 501 and voltage-dropping resistor 502 may be 16 ohms and 870 ohms respectively. In this fourth delay example, the rising-edge delay 802 has a calculated value of 15 microseconds, and the falling-edge delay 803 has a calculated value of 49 microseconds.

Figure 6:
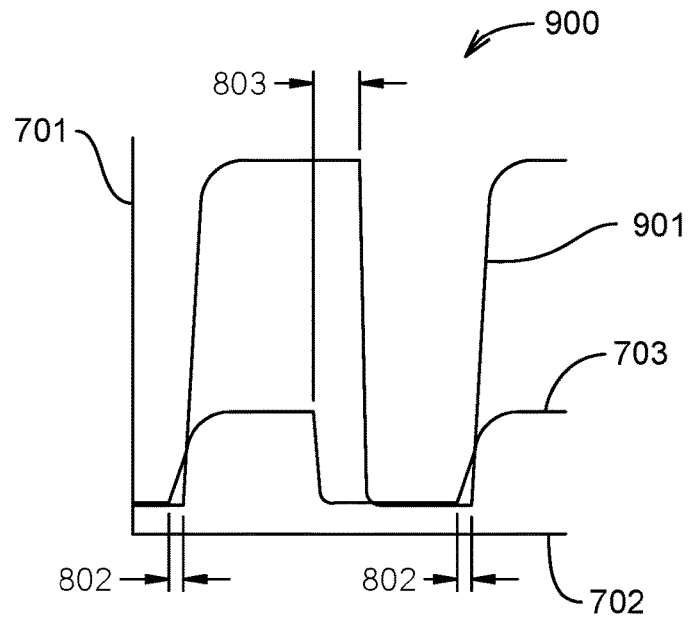
FIG. 6 is a graph in a format similar to that of FIG. 2 but depicting a typical input voltage waveform and output voltage waveform of the digital interface within the digital communications circuit of FIG. 5 when the second delay capacitor is the element producing the delays.

FIG. 6 is a second delay graph 900 having the same format as for the baseline graph 700. Depicted in second delay graph 900 are the low-voltage waveform 703 first presented in baseline graph 700 and a delayed high-voltage fourth delay waveform 901 representing the higher-voltage digital signal at second node 8 in the fourth delay example using modified digital communications circuit 850. The rising-edge delay 802 (15 microseconds) and falling-edge delay 803 (49 microseconds) are indicated in graph 900. It can be observed that periods during which the high-voltage first delay waveform 901 is high in potential are lengthened and periods during which the high-voltage first delay waveform 901 is low in potential are shortened relative to the corresponding periods in the low-voltage waveform 703.

The first, second, and fourth delay examples demonstrate that, while rising-edge delay can be controlled with little effect on falling-edge delay through use of first delay capacitor 753, falling-edge delay 803 can be controlled with minor effect on rising-edge delay 802 through the use of second delay capacitor 754. The effects of first delay capacitor 753 in conjunction with charging resistor 752 and of second delay capacitor 754 are mutually independent, so the two delay methods may be used together to achieve a wide range of relative delays of rising edges versus falling edges.

Figure 7:
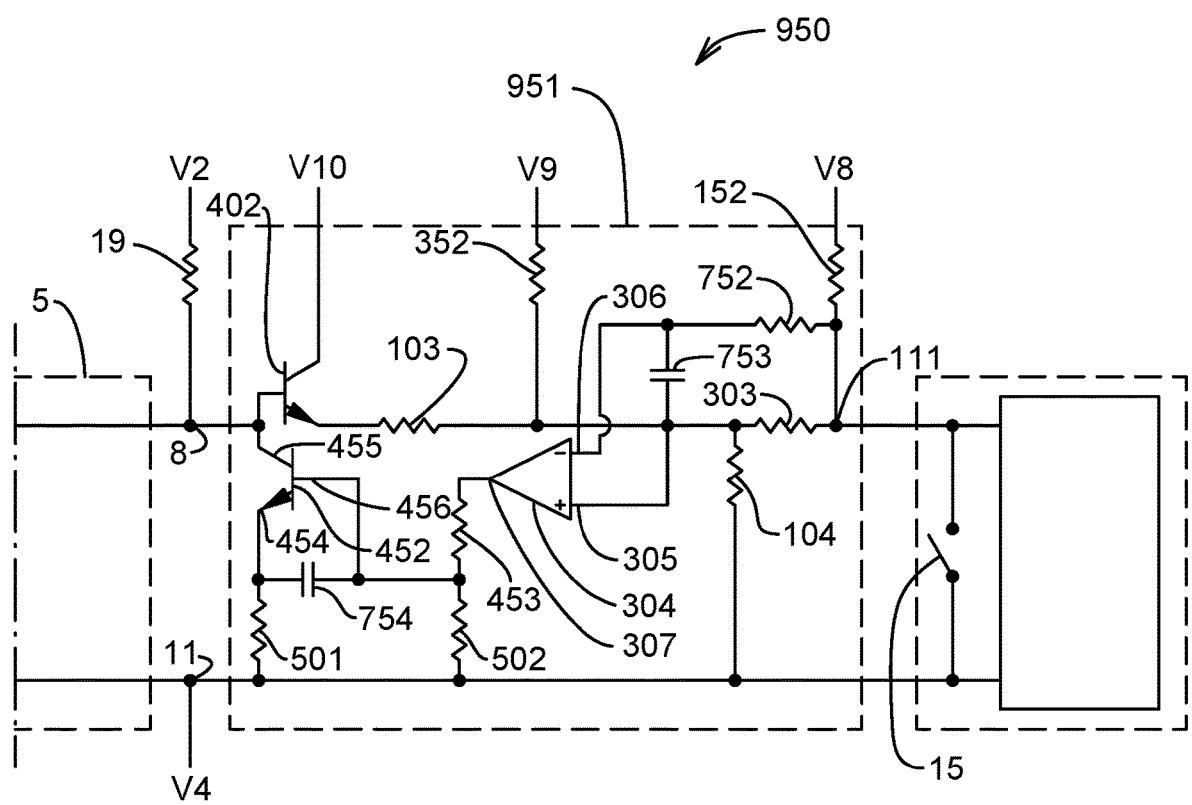
FIG. 7 is a schematic diagram of the digital communications circuit of FIG. 5 further modified to show an alternative connection of the second delay capacitor.

FIG. 7 shows a schematic diagram of a further modified digital communications circuit 950. The further modified digital communications circuit 950 may be identical to the additionally modified digital communications circuit 850 in FIG. 5 but having the second end of second delay capacitor 754 connected to the emitter 454 of switching transistor 452 instead of to fourth node 11. So long as little current is drawn through feedback resistor 501, the fifth delay example has the same delay behavior as has the fourth delay example. If significant current is drawn through feedback resistor 501 during periods in which switching transistor 452 is on, the rising-edge delay 802 of the high-voltage waveform 901 at second node 8 will be reduced and the falling-edge delay 803 will be affected only slightly.

The examples shown demonstrate various ways in which the addition of charging resistor 752, first delay capacitor 753, and/or second delay capacitor 754 to a circuit of the existing art may result in differing rising-edge delays 802 and falling-edge delays 803 and lead to lengthening or shortening of high-potential or low-potential periods in digital pulses. Though some effects of first delay capacitor 753 and second delay capacitor 754 have been shown separately, both delay capacitors may be utilized simultaneously with additive results, since the effects of one on the actions of the other may be insignificant.

Accordingly, while embodiments have been particularly shown and described, many variations may be made therein. Other combinations of features, functions, elements, and/or properties may be used. Such variations, whether they are directed to different combinations or directed to the same combinations, whether different, broader, narrower, or equal in scope, are also included.

The remainder of this section describes additional aspects and features of a delay-adjusted digital-unit interface presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference, in any suitable manner. Some of the paragraphs below expressly refer to and further limit other paragraphs, providing without limitation examples of some of the suitable combinations.

A1. A delay-adjusted digital-unit interface comprising:
a first node configured to be connected to one end of a pull-up resistor, the pull-up resistor having another end connected to a first reference electrical potential, the first node being configured to be connected to a signal line of a transmission line connected to a first digital unit at a distal point on the transmission line, the first digital unit applying a high electrical potential alternating with a low electrical potential to the signal line of the transmission line during communication with a second digital unit;
a second node configured to be connected to a second reference electrical potential, to a signal-return line of the transmission line, and to a signal-return line of the second digital unit, the second reference electrical potential being less than the first reference electrical potential;
a third node configured to be connected to a signal line of the second digital unit, the second digital unit presenting between its signal line and its signal-return line a closed circuit alternating with an open circuit while the second digital unit is transmitting to the first digital unit and a continuous open circuit while the second digital unit is not transmitting to the first digital unit; and
an amplifier assembly configured to be connected between the first node and the third node, the amplifier assembly configured to transform between the high electrical potential on the first node and a medium electrical potential on the third node, the medium electrical potential being less than the high electrical potential and greater than the second reference electrical potential, the amplifier assembly including a switch, a sensing circuit, and a delay element, the sensing circuit including an amplifier, the sensing circuit being responsive to a change in the impedance between the signal line and the signal-return line of the second digital unit for operating the switch, the sensing circuit configured to close the switch at the end of a first delay period following presentation by the second digital unit of a closed circuit between its signal line and its signal-return line and to open the switch at the end of a second delay period following presentation by the second digital unit of an open circuit between its signal line and its signal-return line, the first delay period and the second delay period being governed by the delay element.

A2. The delay-adjusted digital-unit interface of paragraph A1, wherein one of the first delay period and second delay period is less than half as long as the other.

A3. The delay-adjusted digital-unit interface of paragraph A1, wherein the amplifier has a first input and a second input, the delay element has a first terminal connected to the first input of the amplifier and a second terminal connected to the second input of the amplifier, and the delay element includes a capacitor.

A4. The delay-adjusted digital-unit interface of paragraph A3, wherein the capacitor has a first terminal connected to the first terminal of the delay element and a second terminal connected to the second terminal of the delay element.

A5. The delay-adjusted digital-unit interface of paragraph A3, wherein the amplifier assembly includes a charging resistor having a first terminal connected to the second terminal of the delay element and a second terminal connected to the third node.

A6. The delay-adjusted digital-unit interface of paragraph A1, wherein the amplifier assembly further includes a voltage attenuator, the sensing circuit further includes a first resistor connected at one end to the third node and at the other end to a fourth node, the voltage attenuator includes a second resistor connected between the fourth node and the second node, a third resistor connected between the fourth node and a fifth node, and an active device having a non-inverting electrode connected to the fifth node and a control electrode connected to the first node, the active device being configured to produce impedance between the first node and the fifth node when the non-inverting electrode is conducting current, the sensing circuit further includes a fourth resistor connected at one end to the third node and at the other end to a third reference electrical potential and a fifth resistor connected at one end to the fourth node and at the other end to a fourth reference electrical potential, the first input of the amplifier is connected to the fourth node, and the second input of the amplifier is connected to the third node.

A7. The delay-adjusted digital-unit interface of paragraph A1, wherein the switch includes a voltage-inverting transistor having an inverting electrode connected to the first node, a non-inverting electrode connected to the second node, and a control electrode, and the switch further includes a sixth resistor having one end connected to the output of the amplifier and another end connected to the control electrode of the voltage-inverting transistor.

A8. The delay-adjusted digital-unit interface of paragraph A7, wherein the delay element has a first terminal connected to the control electrode of the voltage-inverting transistor and a second terminal connected to the second node and the delay element includes a capacitor.

A9. The delay-adjusted digital-unit interface of paragraph A8, wherein the capacitor has a first terminal connected to the first terminal of the delay element and a second terminal connected to the second terminal of the delay element.

A10. The delay-adjusted digital-unit interface of paragraph A1, wherein the switch includes a voltage-inverting transistor having an inverting electrode, a non-inverting electrode, and a control electrode and further includes a sixth resistor having one end connected to the output of the first amplifier and another end connected to the control electrode of the voltage-inverting transistor, a seventh resistor having one end connected to the second node and another end connected to the non-inverting electrode of the voltage-inverting transistor, and an eighth resistor having one end connected to the second node and another end connected to the control electrode of the voltage-inverting transistor.

A11. The delay-adjusted digital-unit interface of paragraph A10, wherein the delay element has a first terminal connected to the control electrode of the voltage-inverting transistor and a second terminal connected to the second node and the delay element includes a capacitor.

A12. The delay-adjusted digital-unit interface of paragraph A11, wherein the capacitor has a first terminal connected to the first terminal of the delay element and a second terminal connected to the second terminal of the delay element.

A13. The delay-adjusted digital-unit interface of paragraph A10, wherein the delay element has a first terminal connected to the control electrode of the voltage-inverting transistor and a second terminal connected to the non-inverting electrode of the voltage-inverting transistor and the delay element includes a capacitor.

A14. The delay-adjusted digital-unit interface of paragraph A13, wherein the capacitor has a first terminal connected to the first terminal of the delay element and a second terminal connected to the second terminal of the delay element.

INDUSTRIAL APPLICABILITY

The methods and apparatus described in the present disclosure are applicable to the internet-of-things (IOT) industry; the digital sensor industry; the factory control industry; the indoor and greenhouse agricultural and horticultural industries; the general, decorative, outdoor, and specialty lighting industries; the automotive, transportation, and aerospace industries; and any other industries in which digital communication is required over wires or transmission lines, especially where sources of electrical noise, interference, or surges and/or transmission line distortions, such as length disparities, loss, unbalance, and/or electrical discontinuities, may be so great as to prevent error-free communications between digital units.

What is claimed is:
1. A delay-adjusted digital-unit interface comprising:
a first node configured to be connected to one end of a pull-up resistor, the pull-up resistor having another end connected to a first reference electrical potential, the first node being configured to be connected to a signal line of a transmission line connected to a first digital unit at a distal point on the transmission line, the first digital unit applying a high electrical potential alternating with a low electrical potential to the signal line of the transmission line during communication with a second digital unit;
a second node configured to be connected to a second reference electrical potential, to a signal-return line of the transmission line, and to a signal-return line of the second digital unit, the second reference electrical potential being less than the first reference electrical potential;
a third node configured to be connected to a signal line of the second digital unit, the second digital unit presenting between its signal line and its signal-return line a closed circuit alternating with an open circuit while the second digital unit is transmitting to the first digital unit and a continuous open circuit while the second digital unit is not transmitting to the first digital unit; and
an amplifier assembly configured to be connected between the first node and the third node, the amplifier assembly configured to transform between the high electrical potential on the first node and a medium electrical potential on the third node, the medium electrical potential being less than the high electrical potential and greater than the second reference electrical potential, the amplifier assembly including a switch, a sensing circuit, and a delay element, the sensing circuit including an amplifier, the sensing circuit being responsive to a change in the impedance between the signal line and the signal-return line of the second digital unit for operating the switch, the sensing circuit configured to close the switch at the end of a first delay period following presentation by the second digital unit of a closed circuit between its signal line and its signal-return line and to open the switch at the end of a second delay period following presentation by the second digital unit of an open circuit between its signal line and its signal-return line, the first delay period and the second delay period being governed by the delay element.

2. The delay-adjusted digital-unit interface of claim 1, wherein one of the first delay period and second delay period is less than half as long as the other.

3. The delay-adjusted digital-unit interface of claim 1, wherein the amplifier has a first input and a second input, the delay element has a first terminal connected to the first input of the amplifier and a second terminal connected to the second input of the amplifier, and the delay element includes a capacitor.

4. The delay-adjusted digital-unit interface of claim 3, wherein the capacitor has a first terminal connected to the first terminal of the delay element and a second terminal connected to the second terminal of the delay element.

5. The delay-adjusted digital-unit interface of claim 3, wherein the amplifier assembly includes a charging resistor having a first terminal connected to the second terminal of the delay element and a second terminal connected to the third node.

6. The delay-adjusted digital-unit interface of claim 1, wherein the amplifier assembly further includes a voltage attenuator, the sensing circuit further includes a first resistor connected at one end to the third node and at the other end to a fourth node, the voltage attenuator includes a second resistor connected between the fourth node and the second node, a third resistor connected between the fourth node and a fifth node, and an active device having a non-inverting electrode connected to the fifth node and a control electrode connected to the first node, the active device being configured to produce impedance between the first node and the fifth node when the non-inverting electrode is conducting current, the sensing circuit further includes a fourth resistor connected at one end to the third node and at the other end to a third reference electrical potential and a fifth resistor connected at one end to the fourth node and at the other end to a fourth reference electrical potential, the first input of the amplifier is connected to the fourth node, and the second input of the amplifier is connected to the third node.

7. The delay-adjusted digital-unit interface of claim 1, wherein the switch includes a voltage-inverting transistor having an inverting electrode connected to the first node, a non-inverting electrode connected to the second node, and a control electrode, and the switch further includes a sixth resistor having one end connected to the output of the amplifier and another end connected to the control electrode of the voltage-inverting transistor.

8. The delay-adjusted digital-unit interface of claim 7, wherein the delay element has a first terminal connected to the control electrode of the voltage-inverting transistor and a second terminal connected to the second node and the delay element includes a capacitor.

9. The delay-adjusted digital-unit interface of claim 8, wherein the capacitor has a first terminal connected to the first terminal of the delay element and a second terminal connected to the second terminal of the delay element.

10. The delay-adjusted digital-unit interface of claim 1, wherein the switch includes a voltage-inverting transistor having an inverting electrode, a non-inverting electrode, and a control electrode and further includes a sixth resistor having one end connected to the output of the first amplifier and another end connected to the control electrode of the voltage-inverting transistor, a seventh resistor having one end connected to the second node and another end connected to the non-inverting electrode of the voltage-inverting transistor, and an eighth resistor having one end connected to the second node and another end connected to the control electrode of the voltage-inverting transistor.

11. The delay-adjusted digital-unit interface of claim 10, wherein the delay element has a first terminal connected to the control electrode of the voltage-inverting transistor and a second terminal connected to the second node and the delay element includes a capacitor.

12. The delay-adjusted digital-unit interface of claim 11, wherein the capacitor has a first terminal connected to the first terminal of the delay element and a second terminal connected to the second terminal of the delay element.

13. The delay-adjusted digital-unit interface of claim 10, wherein the delay element has a first terminal connected to the control electrode of the voltage-inverting transistor and a second terminal connected to the non-inverting electrode of the voltage-inverting transistor and the delay element includes a capacitor.

14. The delay-adjusted digital-unit interface of claim 13, wherein the capacitor has a first terminal connected to the first terminal of the delay element and a second terminal connected to the second terminal of the delay element.

* * * * *